(12) United States Patent
Sharp

(10) Patent No.: US 11,320,665 B2
(45) Date of Patent: May 3, 2022

(54) RETARDER STACK PAIRS FOR POLARIZATION BASIS VECTOR TRANSFORMATIONS

(71) Applicant: Gary Sharp Innovations, LLC, Boulder, CO (US)

(72) Inventor: Gary D. Sharp, Boulder, CO (US)

(73) Assignee: GARY SHARP INNOVATNONS, LLC, Boulder, CO (US)

( * ) Notice: Subject to any disclaimer, the term of this patent is extended or adjusted under 35 U.S.C. 154(b) by 269 days.

(21) Appl. No.: 16/289,335

(22) Filed: Feb. 28, 2019

(65) Prior Publication Data

US 2019/0271853 A1 Sep. 5, 2019

Related U.S. Application Data

(60) Provisional application No. 62/637,832, filed on Mar. 2, 2018.

(51) Int. Cl.
*G02B 27/28* (2006.01)

(52) U.S. Cl.
CPC .................................. *G02B 27/286* (2013.01)

(58) Field of Classification Search
CPC .......... G02B 27/286; G02B 1/08; G02B 5/30; G02B 5/3016; G02B 5/3083; G02B 5/3091; G02B 27/28; G02B 27/288; G02F 1/1335; G02F 1/13363; G02F 1/133631; G02F 1/133634; G02F 1/133635; G02F 1/133637; G02F 1/133638
USPC ............ 359/489.07, 483.01, 486.01, 486.02, 359/486.03, 487.01, 489.01, 489.02, 359/489.05; 362/19; 353/20; 349/117, 349/118, 119, 120, 121

See application file for complete search history.

(56) References Cited

U.S. PATENT DOCUMENTS

| | | |
|---|---|---|
| 4,511,225 A | 4/1985 | Lipson |
| 4,884,876 A | 12/1989 | Lipton |
| 5,132,826 A | 7/1992 | Johnson et al. |
| 5,231,521 A | 7/1993 | Johnson et al. |
| 5,243,455 A | 9/1993 | Johnson et al. |
| 5,381,253 A | 1/1995 | Sharp et al. |
| 5,387,958 A | 2/1995 | Pashley |
| 5,493,426 A | 2/1996 | Johnson et al. |
| 5,528,393 A | 6/1996 | Sharp et al. |
| 5,552,912 A | 9/1996 | Sharp et al. |
| 5,574,553 A | 11/1996 | McManamon et al. |

(Continued)

*Primary Examiner* — Arnel C Lavarias
(74) *Attorney, Agent, or Firm* — Robert G. Crouch

(57) ABSTRACT

A device for manipulating the polarization of light which includes a first retarder-stack (Stack 1) that converts the polarization of input light from a first polarization basis vector (PBV1) to a second polarization basis vector (PBV2), a second retarder-stack (Stack 2) that returns the polarization of light from PBV2 to PBV1, and one or more optically functional layers between Stack 1 and Stack 2. Stack 1 has a plurality of layers, wherein the number of layers, retardation values, and orientations of layers in Stack 1 are selected to produce a PBV2 that is substantially spectrally-uniform over a prescribed range of wavelengths. PBV1 is a non-trivial eigen-polarization of combined Stack 1 and Stack 2. Stack 2 has a plurality of layers and Stack 2 is arranged in series with Stack 1. Alternatively, instead of two different stacks, a reflector may be used to produce a return pass through Stack 1.

28 Claims, 10 Drawing Sheets

(56) References Cited

U.S. PATENT DOCUMENTS

| | | | |
|---|---|---|---|
| 5,619,355 A | 4/1997 | Sharp et al. | |
| 5,627,666 A | 5/1997 | Sharp et al. | |
| 5,658,490 A | 8/1997 | Sharp et al. | |
| 5,689,317 A | 11/1997 | Miller | |
| 5,715,023 A | 2/1998 | Hoppe | |
| 5,751,384 A | 5/1998 | Sharp | |
| 5,781,268 A | 7/1998 | Liu et al. | |
| 5,822,021 A | 10/1998 | Johnson et al. | |
| 5,870,159 A | 2/1999 | Sharp | |
| 5,892,559 A | 4/1999 | Sharp | |
| 5,892,612 A | 4/1999 | Miller | |
| 5,929,946 A | 7/1999 | Sharp et al. | |
| 5,953,083 A | 9/1999 | Sharp | |
| 5,990,996 A | 11/1999 | Sharp | |
| 5,999,240 A | 12/1999 | Sharp et al. | |
| 6,028,656 A | 2/2000 | Buhrer | |
| 6,046,786 A | 4/2000 | Sharp et al. | |
| 6,049,367 A | 4/2000 | Sharp et al. | |
| 6,075,651 A | 6/2000 | Hoppe | |
| 6,078,374 A | 6/2000 | Sharp et al. | |
| 6,091,462 A | 7/2000 | Sharp et al. | |
| 6,097,461 A | 8/2000 | Sharp | |
| 6,141,069 A | 10/2000 | Sharp et al. | |
| 6,141,071 A | 10/2000 | Sharp | |
| 6,172,722 B1 | 1/2001 | Sharp | |
| 6,183,091 B1 | 2/2001 | Johnson et al. | |
| 6,252,638 B1 | 6/2001 | Johnson et al. | |
| 6,273,571 B1 | 8/2001 | Sharp et al. | |
| 6,310,673 B1 | 10/2001 | Sharp | |
| 6,380,997 B1 | 4/2002 | Sharp et al. | |
| 6,417,892 B1 | 7/2002 | Sharp et al. | |
| 6,452,646 B1 | 9/2002 | Sharp et al. | |
| 6,630,037 B1 | 10/2003 | Sawada | |
| 6,638,583 B1 | 10/2003 | Sharp et al. | |
| 6,650,377 B2 | 11/2003 | Robinson et al. | |
| 6,667,784 B2 | 12/2003 | Sharp et al. | |
| 6,704,065 B1 | 3/2004 | Sharp et al. | |
| 6,707,516 B1 | 3/2004 | Johnson et al. | |
| 6,735,017 B1 | 5/2004 | Acosta | |
| 6,816,309 B2 | 11/2004 | Chen et al. | |
| 6,882,384 B1 | 4/2005 | Sharp | |
| 6,899,430 B2 | 5/2005 | Johnson et al. | |
| 6,922,221 B2 | 7/2005 | Zhu | |
| 6,961,179 B2 | 11/2005 | Chen et al. | |
| 6,961,181 B2 | 11/2005 | Chen et al. | |
| 7,002,752 B2 | 2/2006 | Chen et al. | |
| 7,083,282 B1 | 8/2006 | Sharp et al. | |
| 7,106,509 B2 | 9/2006 | Sharp | |
| 7,126,649 B2 | 10/2006 | Chen et al. | |
| 7,154,667 B2 | 12/2006 | Birge et al. | |
| 7,195,356 B1 | 3/2007 | Sharp | |
| 7,298,386 B1 | 11/2007 | Sharp et al. | |
| 7,345,723 B2 | 3/2008 | Robinson et al. | |
| 7,436,476 B2 | 10/2008 | Sharp et al. | |
| 7,510,280 B2 | 3/2009 | Sharp | |
| 7,511,787 B2 * | 3/2009 | Sharp ................... | G02B 27/288 349/119 |
| 7,528,906 B2 | 5/2009 | Robinson et al. | |
| 7,545,469 B2 | 6/2009 | Robinson et al. | |
| 7,583,439 B2 | 9/2009 | Tsai | |
| 7,692,746 B2 | 4/2010 | Sharp | |
| 7,898,603 B2 | 3/2011 | Sharp | |
| 7,898,734 B2 | 3/2011 | Coleman et al. | |
| 7,905,602 B2 | 3/2011 | Schuck et al. | |
| 8,004,758 B2 | 8/2011 | Coleman et al. | |
| 8,072,681 B2 | 12/2011 | Coleman et al. | |
| 8,085,644 B2 | 12/2011 | Sharp | |
| 8,169,699 B2 | 5/2012 | Petersen et al. | |
| 8,184,215 B2 | 5/2012 | Osterman et al. | |
| 8,194,315 B2 | 6/2012 | Sharp et al. | |
| 8,220,934 B2 | 7/2012 | Schuck et al. | |
| 8,233,034 B2 | 7/2012 | Sharp et al. | |
| 8,328,362 B2 | 12/2012 | Coleman et al. | |
| 8,330,911 B2 | 12/2012 | Hong | |
| 8,403,488 B2 | 3/2013 | Schuck et al. | |
| 8,408,708 B2 | 4/2013 | Sharp | |
| 8,425,041 B2 | 4/2013 | Schuck et al. | |
| 8,427,394 B2 | 4/2013 | Sharp et al. | |
| 8,488,240 B2 | 7/2013 | Petersen et al. | |
| 8,526,106 B2 | 9/2013 | Coleman | |
| 8,540,372 B2 | 9/2013 | Coleman | |
| 8,638,400 B2 | 1/2014 | Sharp | |
| 8,659,828 B2 | 2/2014 | Sharp | |
| 8,687,275 B2 | 4/2014 | Coleman | |
| 8,711,477 B2 | 4/2014 | Coleman | |
| 8,724,218 B2 | 5/2014 | Curtis | |
| 8,727,536 B2 | 5/2014 | Schuck | |
| 8,746,876 B2 | 6/2014 | Sharp | |
| 8,757,806 B2 | 6/2014 | Schuck | |
| 8,760,760 B2 | 6/2014 | Coleman | |
| 8,794,764 B2 | 8/2014 | Schuck | |
| 8,820,937 B2 | 9/2014 | Osterman et al. | |
| 8,833,943 B2 | 9/2014 | Schuck | |
| 8,851,680 B2 | 10/2014 | Sharp | |
| 8,891,042 B1 | 11/2014 | Osterman et al. | |
| 8,908,081 B2 | 12/2014 | Davis | |
| 8,941,801 B2 | 1/2015 | Robinson | |
| 9,046,755 B2 | 6/2015 | Sharp | |
| 9,057,880 B2 | 6/2015 | Curtis | |
| 9,086,578 B2 | 7/2015 | Curtis | |
| 9,110,363 B2 | 8/2015 | Petersen | |
| 9,121,999 B2 | 9/2015 | Fan | |
| 9,146,454 B2 | 9/2015 | Coleman | |
| 9,167,236 B2 | 10/2015 | Sharp | |
| 9,223,142 B2 | 12/2015 | Schuck | |
| 9,229,139 B2 | 1/2016 | Osterman et al. | |
| 9,235,057 B2 | 1/2016 | Robinson | |
| 9,310,618 B2 | 4/2016 | Curtis | |
| 9,316,865 B2 | 4/2016 | Osterman et al. | |
| 9,350,980 B2 | 5/2016 | Robinson | |
| 9,380,220 B2 | 6/2016 | Davis | |
| 9,383,590 B2 | 7/2016 | Sharp | |
| 9,457,523 B2 | 10/2016 | Coleman | |
| 9,459,463 B2 | 10/2016 | Sharp | |
| 9,530,397 B2 | 12/2016 | Sharp | |
| 9,554,125 B2 | 1/2017 | Schuck | |
| 9,594,298 B2 | 3/2017 | Schuck | |
| 9,618,765 B2 | 4/2017 | Sharp | |
| 9,625,745 B2 | 4/2017 | Sharp | |
| 9,664,945 B2 | 5/2017 | Liu | |
| 9,680,132 B1 | 6/2017 | Tsai | |
| 9,686,474 B2 | 6/2017 | Davis | |
| 9,709,883 B2 | 7/2017 | Sharp | |
| 9,740,016 B2 | 8/2017 | Schuck | |
| 9,823,561 B2 | 11/2017 | Sharp | |
| 9,854,180 B2 | 12/2017 | Davis | |
| 9,910,207 B2 | 3/2018 | Robinson | |
| 9,933,631 B2 | 4/2018 | Osterman et al. | |
| 9,933,636 B2 * | 4/2018 | Sharp ................... | G02B 5/3083 |
| 9,946,088 B2 | 4/2018 | Robinson | |
| 10,012,884 B2 | 7/2018 | Osterman et al. | |
| 10,049,627 B2 | 8/2018 | Schuck | |
| 10,054,851 B2 | 8/2018 | Sharp | |
| 10,082,675 B2 | 9/2018 | Sharp | |
| 10,129,484 B2 | 11/2018 | Davis | |
| 10,187,588 B2 | 1/2019 | Davis | |
| 10,203,511 B2 | 2/2019 | Schuck | |
| 10,393,946 B2 | 8/2019 | Robinson | |
| 10,394,040 B2 | 8/2019 | Gollier | |
| 10,401,700 B2 | 9/2019 | Osterman et al. | |
| 10,416,461 B2 | 9/2019 | Gollier | |
| 10,474,229 B1 | 11/2019 | Gollier | |
| 10,495,798 B1 | 12/2019 | Peng | |
| 10,502,981 B2 * | 12/2019 | Sharp ................... | G02B 5/3083 |
| 10,520,772 B1 | 12/2019 | Lu | |
| 10,539,829 B1 | 1/2020 | Lu | |
| 10,545,348 B1 | 1/2020 | Lu | |
| 10,571,719 B1 | 2/2020 | McCabe | |
| 10,598,928 B1 | 3/2020 | Lam | |
| 10,598,945 B1 | 3/2020 | Lu | |
| 10,600,352 B1 | 3/2020 | Wheelwright | |
| 10,609,364 B2 | 3/2020 | Geng | |
| 10,614,767 B2 | 4/2020 | Sharp | |
| 10,630,908 B2 | 4/2020 | Davis | |

(56) References Cited

U.S. PATENT DOCUMENTS

| | | |
|---|---|---|
| 10,642,048 B2 | 5/2020 | Peng |
| 10,670,861 B2 | 6/2020 | Gollier |
| 10,670,928 B2 | 6/2020 | Shi |
| 10,678,057 B2 | 6/2020 | Lu |
| 10,678,116 B1 | 6/2020 | Lam |
| 10,690,930 B1 | 6/2020 | Lu |
| 10,691,198 B1 | 6/2020 | Gollier |
| 10,705,401 B1 | 7/2020 | Lu |
| 10,712,485 B1 | 7/2020 | Lam |
| 10,739,611 B2 | 8/2020 | Sharp |
| 10,739,651 B2 | 8/2020 | Sharp |
| 10,809,585 B1 | 10/2020 | Lu |
| 10,838,214 B2 | 11/2020 | Chen |
| 10,839,609 B2 | 11/2020 | Sears |
| 10,845,597 B1 | 11/2020 | Gollier |
| 10,866,429 B2 | 12/2020 | Sharp |
| 10,871,653 B1 | 12/2020 | Osterman et al. |
| 10,890,823 B1 | 1/2021 | Jiang |
| 10,895,675 B2 | 1/2021 | Sharp |
| 10,901,205 B1 | 1/2021 | Lu |
| 10,902,820 B2 | 1/2021 | Peng |
| 10,914,953 B1 | 2/2021 | Lam |
| 10,928,698 B2 | 2/2021 | Osterman et al. |
| 10,934,381 B2 | 3/2021 | Lu |
| 10,935,790 B2 | 3/2021 | Lu |
| 10,935,804 B1 | 3/2021 | Lu |
| 2016/0109730 A1 | 4/2016 | McDowall |
| 2018/0039004 A1 | 2/2018 | Yun |
| 2018/0039052 A1 | 2/2018 | Khan |
| 2018/0210223 A1 | 7/2018 | Sharp |
| 2018/0259692 A1 | 9/2018 | Sharp |
| 2019/0018177 A1 | 1/2019 | Sharp |
| 2019/0235145 A1 | 8/2019 | Sharp |
| 2019/0235300 A1 | 8/2019 | Sharp |
| 2019/0265467 A1 | 8/2019 | Yun |
| 2019/0271853 A1 | 9/2019 | Sharp |
| 2019/0302479 A1 | 10/2019 | Smyth |
| 2019/0377176 A1 | 12/2019 | Sharp |
| 2019/0377182 A1 | 12/2019 | Sharp |
| 2019/0377183 A1 | 12/2019 | Sharp |
| 2019/0377184 A1 | 12/2019 | Sharp |
| 2020/0116912 A1 | 4/2020 | Sharp |
| 2020/0142276 A1 | 5/2020 | McGettigan |
| 2020/0241305 A1 | 7/2020 | Ouderkirk |
| 2020/0241312 A1 | 7/2020 | McGettigan |
| 2020/0379155 A1 | 12/2020 | Sharp |
| 2020/0409183 A1 | 12/2020 | Saylor |
| 2021/0041711 A1 | 2/2021 | Sharp |

* cited by examiner

RETARDER STACK PAIRS FOR POLARIZATION BASIS VECTOR TRANSFORMATIONS

CROSS-REFERENCE TO RELATED APPLICATIONS

This application claims priority to U.S. Provisional Application No. 62/634,832, filed Mar. 2, 2018, the contents of which are incorporated herein by reference in its entirety.

BACKGROUND

Retarder stacks with an engineered impulse-response are useful for wavelength-selective polarization transformations. One of the practical issues for use of retarder-stacks in optical systems is the thickness-direction retardation ($R_{th}$) of readily available uniaxial retarder materials. $R_{th}$ can have the effect of limiting the acceptance angle of the retarder stack due to corruption of the impulse-response off-normal. A particular polarization-spectrum requirement drives the number of impulses, and hence the number of retarder layers that can determine the composite $R_{th}$. This highlights a tradeoff that can exist between the number of samples in the impulse train and the useful acceptance angle of the retarder stack when using such materials.

Also described in the prior art are the more design-constrained impulse-responses associated with retarder stack pairs, where relationships in retarder thickness and angle may exist between corresponding layers of each of the stacks in order to achieve a desired impulse-response or polarization spectrum. The constraint may take the form of an additional requirement that a specific state of polarization (SOP) is generated both between the stacks and at the output of the pair. An example of this is a spectral switch (liquid crystal device between a stack pair), where the SOP at the location between the stacks determines the wavelength range over which an LC device can switch the SOP (see e.g. U.S. Pat. No. 6,882,384, incorporated herein by reference).

Retarder stack pairs are also useful for transforming from a first polarization basis vector (PBV1) (e.g. linear) to a second polarization basis vector (PBV2) (e.g. circular). This can be useful for addressing compatibility issues between different types of polarization optical components used in a system (e.g. linear polarizers and cholesteric liquid crystals). The second stack can then restore PBV1. Such basis vector transformations are often required to be wavelength and angle-of-incidence insensitive.

Examples of retarder stack pair angle relationships are discussed in, for example, Chapter 6 (pages 143-151) Polarization Engineering for LCD Projection, by Robinson, Chen and Sharp, incorporated herein by reference. Among others, these include (1) Reverse Order (RO), (2) Reverse-Order with Reflection, (3) Reverse-Order Reflection/Rotation and (4) Reverse-Order Rotation (aka Reverse-Order-Crossed (ROC)). Certain symmetries between the stacks can be useful for constraining the impulse-response that determines PBV2.

It is against this background that the techniques described herein have been developed.

SUMMARY

Disclosed herein is a device for manipulating the polarization of light that includes a first retarder-stack (Stack 1) that converts the polarization of input light from a first polarization basis vector (PBV1) to a second polarization basis vector (PBV2), Stack 1 having a plurality of layers, wherein the number of layers, retardation values, and orientations of layers in Stack 1 are selected to produce a PBV2 that is substantially spectrally-uniform over a prescribed range of wavelengths. It also includes a second retarder-stack (Stack 2) that returns the polarization of light from PBV2 to PBV1, wherein PBV1 is a non-trivial eigen-polarization of combined Stack 1 and Stack 2, Stack 2 having a plurality of layers, wherein Stack 2 is arranged in series with Stack 1. It further includes one or more optically functional layers between Stack 1 and Stack 2.

Each of Stack 1 and Stack 2 may have base retarder layers and the base retarder layers of Stack 1 and Stack 2 each have $R_{th} \geq R_e/2$. The layers of Stack 2 may have a reverse-order (RO) arrangement with respect to the layers of Stack 1. Each of Stack 1 and Stack 2 may have base retarder layers and the base retarder layers of Stack 1 and Stack 2 each have a birefringence dispersion of near zero. Each of Stack 1 and Stack 2 may have base retarder layers and the base retarder layers of Stack 1 and Stack 2 have reverse birefringence dispersion. Each of Stack 1 and Stack 2 may have base retarder layers and the base retarder layers of Stack 1 and Stack 2 may be one of cyclic-olefin polymer, cyclic olefin co-polymer, or polycarbonate.

The layers of Stack 1 and Stack 2 may be solvent bonded to each other. PBV1 may a linear polarization and PBV2 may be the ±45°-rotated version of PBV1. Stack 1 may contain two or more half-wave retarders. One or both of a positive c-plate and a crossed negative a-plate may be inserted between Stack 1 and Stack 2 to reduce the composite $R_{th}$.

PBV1 may be a linear polarization and PBV2 may be a circular polarization. The device may further include a first linear polarizer preceding Stack 1 and a second linear polarizer following Stack 2, with the first and second linear polarizers having parallel absorption axes. The first linear polarizer layer may be clad with protective substrates having $R_{th} < 5$ nm. The ellipticity field-ratio of PBV2 may be at least 0.95 in the red, green, and blue portions of the spectrum. The ellipticity field-ratio of PBV2 may be at least 0.98 in the red, green, and blue portions of the spectrum. The layers of Stack 2 may have a reverse-order-reflection-about-zero (RORAZ) arrangement with respect to the layers of Stack 1. Stack 1 may contain one or more half-wave retarders followed by a quarter-wave retarder. Stack 1 may contain M half-wave retarders with slow-axes oriented at angles $(\alpha_1, \alpha_2 \ldots \alpha_M)$ such that $(\alpha_2 > 2\alpha_1, \alpha_3 > 2\alpha_2, \ldots)$, producing a quasi-linear rotated SOP with orientation $\beta = 2(\alpha_M - \alpha_{M-1} + \alpha_{M-2} - \ldots)$, followed by a quarter-wave retarder with slow-axis orientation substantially along $\alpha_0 = (\beta + \pi/4)$. The device may further include one or both of a positive c-plate and a crossed negative a-plate inserted between Stack 1 and Stack 2 to reduce the composite $R_{th}$.

Also disclosed is a device for manipulating the polarization of light, including a retarder-stack that converts the polarization of forward-pass light from a linear polarization (PBV1) to a circular polarization (PBV2) over a prescribed range of wavelengths, wherein the retarder-stack has base retarder layers that each have $R_{th} \geq R_e/2$, wherein the retarder-stack contains M half-wave retarders with slow-axes oriented at angles $(\alpha_1, \alpha_2 \ldots \alpha_M)$ such that $(\alpha_2 > 2\alpha_1, \alpha_3 > 2\alpha_2, \ldots)$, producing a quasi-linear rotated SOP at angle $\beta = 2(\alpha_M - \alpha_{M-1} + \alpha_{M-2} - \ldots)$, followed by a quarter-wave retarder with slow-axis oriented substantially along $\alpha_0 = (\beta + \pi/4)$, and wherein M and the specific angles are selected to produce PBV2 with ellipticity near unity over a prescribed range of wavelengths; and a reflector that produces a polarization-preserving reflection, returning at least a portion of the forward-pass light to the retarder-stack with opposite handedness, wherein return-light undergoes an effective reverse-order (RO) pass of the retarder-stack, such that the exiting polarization is substantially orthogonal to PBV1.

The device may further include a linear polarizer preceding Stack 1. The linear polarizer layer may be clad with protective substrates having $R_{th}$<5 nm. The device may further include one or both of a positive c-plate and a crossed negative a-plate inserted between Stack 1 and the reflector to reduce the composite $R_{th}$. M may equal 1, $\alpha_1$ may be approximately 14.5°, $\alpha_0$ may be approximately 74°, and the C-plate retardation may be 50 nm≤$R_{th}$≤300 nm. M may equal 3, $\alpha_1$ may be approximately 2°, $\alpha_2$ may be approximately 14°, and $\alpha_3$ may be approximately 48°, $\alpha_0$ may be approximately −63° and the C-plate retardation may be 50 nm≤$R_{th}$≤300 nm. The aggregated ellipticity field-ratio exiting the retarder stack in the forward pass may be >0.91 in the red, green, and blue portions of the spectrum. The aggregated ellipticity field-ratio exiting the retarder stack in the forward pass may be >0.98 in the red, green, and blue portions of the spectrum.

DETAILED DESCRIPTION

Figure 1:
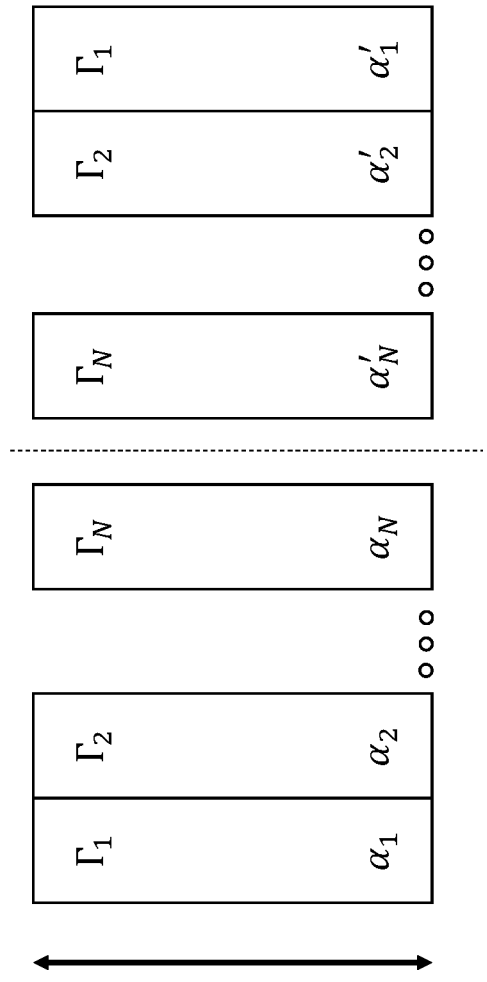
FIG. 1 shows a prior art retarder stack pair with matched retardation and general angle relationships.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The invention may be generally relevant to polarization transformations produced by linear retarder-stacks. The need for a retarder-stack is frequently borne out of necessity, owing to deficiencies in available anisotropic material properties. Such deficiencies can impact normal-incidence and/or off-normal behavior. For instance, an achromatic conversion from linear to circular polarization could in principle be accomplished in a single layer, using a linear retarder material that allows specifying the birefringence dispersion at all relevant wavelengths. For an achromatic retardation, an increase in optical pathlength-difference (i.e. increase in birefringence) can compensate for an increase in wavelength, maintaining a constant phase retardation. Moreover, ideal performance could be maintained off-normal if the biaxiality could be controlled in such a way that retardation in the thickness direction ($R_{th}$) is zero. In the absence of such materials, retarder stacks can be an attractive alternative for synthesizing a normal-incidence polarization transformation spectrum. However, the thickness-direction retardation of such stacks can limit the useful acceptance angle when using uniaxial retarders.

For a typical uniaxially stretched polymer retarder film, the in-plane pathlength difference is given by, $R_e=(n_x-n_y)d$, where $n_x$ is the refractive index in the stretching direction (usually the machine direction), $n_y$ is the refractive index in the transverse direction (or cross-web), and d is the film thickness. These refractive indexes are wavelength-dependent, such that the difference (aka birefringence) typically decreases with wavelength. The usual phase retardation is the angle associated with the ratio of (wavelength-dependent) pathlength-difference to wavelength.

The increase in average in-plane refractive index creates a pathlength-difference in the thickness direction, given by $$R_{th} = \left[\left(\frac{n_x+n_y}{2}\right)-n_z\right]d$$

where $n_z$ is the refractive index in the thickness direction. For a typical uniaxial (aka A-plate) retarder, $n_y=n_z=n_o$ and $n_x=n_e$ (i.e. ordinary and extraordinary refractive index). A common positive uniaxial retarder has a greater average refractive index in-plane ($R_e$) than in the thickness direction. The associated pathlength difference is in general half of the in-plane pathlength difference, or $R_{th}=+R_e/2$.

When light is incident off-normal, the thickness direction retardation has the effect of modifying the complex amplitude of the impulse-train of a retarder stack, which typically degrades the polarization transformation. The specific nature of the degradation depends upon the plane of incidence (POI) azimuth orientation relative to the distribution of retarders in the stack. However, it is generally true that; (A) performance becomes progressively worse as the angle-of-incidence (AOI) increases and, (B) increasing the number of layers to improve quality of a particular transformation increases the composite (or cumulative) $R_{th}$, resulting in a more rapid decline in performance with AOI. Solutions to this problem include either the use of more exotic and/or complex retarder-stack materials, or designing optical systems with more collimated inputs. Neither of these may be practical in certain applications.

FIG. 1 shows a particular retarder stack pair of the prior art, where the normal-incidence retardation ($\Gamma_r$) of each layer of Stack 1 is identical to that of the counterpart layer in Stack 2. The corresponding layers are mirrored about the mid-point, as shown. The specific optic-axis angles ($\alpha_i$) for the layers of Stack 1 depend upon the desired impulse response in transforming from PBV1 to PBV2. The relationships between the angles of each of the corresponding layers of Stack 1 and Stack 2 ($\alpha'_i$) may be further constrained if the objective is to (e.g.) restore PBV1.

Figure 2:
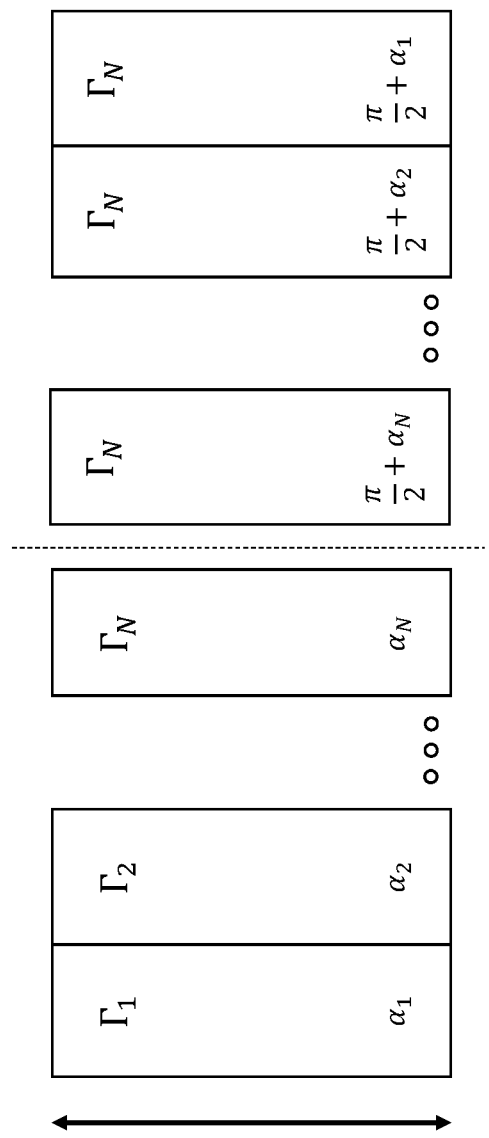
FIG. 2 shows a prior art reverse-order-crossed (ROC) retarder stack pair.

In a design methodology of the prior art, this can be accomplished as follows:

1. Constrain the first stack design directly by forcing a particular PBV2 from the specific PBV1. Alternatively, constrain the impulse response of a stack pair possessing a particular symmetry in such a way that a particular PBV2 is forced.
2. Arrange the second stack to form a reverse-order-crossed (ROC) stack pair, as shown in FIG. 2. In the ROC arrangement, each layer in Stack 1 has the same retardation and is crossed with the counterpart layer in Stack 2. This configuration guarantees that the composite Jones matrix is the identity matrix at normal incidence, regardless of PBV2, and therefore that the original PBV1 is restored at all wavelengths.
3. Insert $R_{th}$ compensation as needed to best maintain the normal-incidence impulse response over the range of incidence angles and wavelengths.

In the ROC arrangement, the Jones matrix for combined Stack 1 and Stack 2 is in general the identity matrix (i.e. the off-diagonal terms are identically zero, and the diagonal components have the identical complex-amplitude). This is termed herein as the "trivial-case," as Stack 2 can always be formed without regard for either the specific input basis vector (PBV1), or the specific transformation to PBV2. In the broader solution space, the magnitude of the off-diagonal terms is minimized via the design (equivalent to stating that the magnitude of the diagonal terms is unity for a lossless retarder-stack), but an arbitrary phase-difference can exist between the diagonal components in the PBV1 space. This phase-difference is termed herein as a "linear compound-retardation," and is a variable that can be exploited to identify designs with low composite $R_{th}$. Because the Jones matrix is in general diagonal, it is termed an "eigen-polarization" of combined Stack 1 and Stack 2. In summary, designs of the invention represent Jones matrices in the PBV1 space that represent non-trivial eigen-polarizations of combined Stack 1 and Stack 2. Again, solutions in this broader design space are preferred that have inherently lower intrinsic AOI sensitivity than the trivial case.

At issue is the fact that the prior art approach can over-constrain the design space. That is, the present disclosure recognizes that the stack pair transformation need not be the identity matrix in some cases. Importantly, the ROC arrangement for restoration of PBV1 may limit the inherent AOI sensitivity and/or effectiveness of compensation schemes in mitigating AOI dependence. In some instances, the azimuth and wavelength dependence of $R_{th}$ can make effective compensation of the ROC solution a practical impossibility. In an aspect of the present invention, retarder-stack pairs accomplish the required PBV transformations, with minimal composite $R_{th}$, that respond well to practical compensation schemes for preserving performance over a broad range of wavelengths and incidence angles. To the extent that the azimuth-dependence of $R_{th}$ can be matched to a simple compensator (e.g. a C-plate), equal in magnitude, and opposite in sign, the structure can preserve the normal-incidence impulse response for all AOI.

In the most general sense, Stack 1 produces one (or more) spectral bands over which the polarization is converted from PBV1 to PBV2. It may further include designs where one (or more) spectral bands retain PBV1, along with one (or more) transition spectral bands where the SOP is in an intermediate polarization state. A method for designing Stack 1 is to directly constrain the impulse response. Finite-impulse-response (FIR) filter design methodologies are known to be useful for identifying stack designs, though they do not in general allow specifying polarization transformations. Linear systems theory can relate the power transmission to the impulse response, where a set of designs that produce a particular transmission spectrum (typically between linear polarizers), can be identified. In the present disclosure, the objective is to identify the subset of stack designs that produce a particular polarization transformation spectrum from the more general solutions that satisfy the power transmission spectrum constraint. This additional constraint may be imposed using retarder-stack pairs with certain (retardation/angle) symmetries.

For a linearly polarized input, it may be required that the SOP between the stacks (PBV2) is intermediate; such as circular, ±45° rotated linear, or other elliptical polarizations that lie in the ($S_2/S_3$) plane of the Poincare sphere. However, the transformation to PBV2, and associated wavelength dependence, are actually arbitrary as may be required by the application. It may further be required that the second stack restores PBV1, or transform to another basis vector.

In some instances, there is a need for stack-pair designs that transform from an achromatic (aka broad-band) first polarization basis vector (PBV1), to a second achromatic polarization basis vector (PBV2) using Stack 1, and then return the light to PBV1 using Stack 2. Under these circumstances, the present disclosure recognizes that the input polarization can be regarded an eigen-polarization of the combined Stack 1 and Stack 2. In other words, the combination represents a (lossless) diagonalized Jones matrix. Physically, the structure has a compound optic-axis that is wavelength-stable and parallel/perpendicular to the input polarization. An additional constraint is necessary in order to identify specific stack designs that transform from PBV1 to PBV2. As discussed, a prior art solution is to identify the latter, and then construct the reverse-order-crossed (ROC) arrangement. In the case of ROC, the Jones matrix represents the identity matrix, which is a sufficient but unnecessary constraint. Physically, the ROC arrangement appears isotropic at normal incidence, and by definition, will preserve an input polarization in transmission. The present disclosure explores solutions other than ROC, with the intention of identifying stacks with minimal composite $R_{th}$, or an impulse response that is relatively robust when light is incident off-normal. It further includes designs that respond well to available compensation schemes.

Of interest in other instances are stack-pair designs that transform from an achromatic first polarization basis vector (PBV1), to a second achromatic polarization basis vector (PBV2) using Stack 1, and then transform the light to a state orthogonal to PBV1 using Stack 2. In one example, the stack pair has a reverse-order (RO) relationship, or operates in reflection-mode (e.g. a retro-reflector follows Stack 1), which is effectively RO. An example of this is an optical isolator, where Stack 1 transforms from linear to circular polarization, with the reverse-order pass of Stack 1 converting from circular to orthogonal linear polarization. This light is oriented along the absorption axis of a linear polarizer, and is therefore extinguished. Of course, this arrangement can also be constructed by arranging Stack 2 to form the RO structure in transmission mode. As discussed, stacks that effectively convert from linear to circular polarization over a broad range of wavelengths may require several layers, giving excellent normal-incidence behavior, but often at the expense of performance (e.g. isolator contrast) off-normal.

An objective of the present disclosure is to identify optimum stack designs, using available (e.g. positive uniaxial) materials and practical compensation, that best preserve the normal-incidence impulse response over a range of incidence angles. Compensation typically refers to retarder layers that do not contribute to the polarization transformation at normal incidence, but which attempt to correct for polarization errors when light is incident off-normal. Rather than compensate each layer of a retarder stack, one approach of the invention is to explore design space for solutions that consolidate compensation to a single location (e.g.) between a stack pair. Methods for compensating to decouple normal-incidence performance from angle-of-incidence sensitivity in uniaxial stacks are described in co-pending US Patent Application Publication No. 2019/0018177, entitled "Wide-Angle Compensation of Uniaxial Retarder-Stack Pairs", the contents of which are incorporated by reference. The present disclosure seeks to identify a broader set of solutions (e.g. not limited to ROC) for performing the requisite polarization transformations, with a notable benefit that the symmetry enables better AOI performance. This is done by exploiting (e.g.) symmetries between the stacks that sufficiently constrain the solutions.

Recent applications have driven a need for polarization optics that precisely transform forward/backward between linear and circular polarizations. Often this transformation must be insensitive to both wavelength and incidence angle. Often the building blocks are limited to positive uniaxial retarders that can create the design challenges described. Examples include cholesteric liquid crystals, geometric-phase diffractive optical elements (lenses, beam-steerers, etc.), and holographic optical elements with circular eigenpolarizations. Linear polarizers are very common, so a transformation is thus needed to switch between polarization basis vectors to optimize the performance of each polarization optic.

Another example includes polarization switches, such as liquid crystal devices. For instance (as described in U.S. Pat. Nos. 5,619,355 and 6,882,384, each of which are incorporated herein by reference), LC variable retarders can be used to switch the orientation, ellipticity, phase, or handedness of an input polarization state. Retarder stacks can be used to transform the SOP to precondition for such modulation. In the present invention, broad-band transformations with wide acceptance angle can be combined with wide-angle broadband LC switches to create a new class of modulator. An example of the latter is disclosed in co-pending U.S. patent application Ser. No. 16/195,618, entitled "Self-Compensating Liquid Crystal Retardation Switch", the entire contents of which are hereby incorporated by reference.

Another example includes a polarization-based isolator, typically composed of a linear absorptive polarizer followed by a quarter-wave retarder. In this arrangement, light transmitted by the polarizer in the forward-pass is absorbed by it in the reverse-pass, provided that return-light is from a down-stream pure specular reflection, and that the retarder provides a half-wave retardation in a round-trip. These simple isolators were used in applications such as eliminating glare from CRT monitors. Today they are relevant to (e.g.) sunlight-readability of mobile phones. This is particularly so for OLED displays, which are highly susceptible to reflection from the addressing structure. But because the OLED does not otherwise require a polarizer (versus e.g. an LCD), and because the return is virtually specular, this isolator can be very effective. Typically, isolator contrast is limited by the wavelength and angle-of-incidence dependence of the conversion from linear to quasi-circular. As such, the designs of the invention are highly relevant to the OLED display.

Another example includes wide-angle collimators, as described in co-pending U.S. patent application Ser. No. 16/260,903, entitled "Hollow Triple-Pass Optical Elements", the entire contents of which are hereby incorporated by reference. In this case, a forward pass (Stack 1+Stack 2) must restore the input SOP, while a subsequent double-pass (i.e. RO) of Stack 2 must convert from the input SOP to the orthogonal SOP. This typically requires a PBV transformation via Stack 1 from linear to circular, with the double-pass of Stack 2 acting as an achromatic half-wave retarder. Such structures must typically operate over the entire visible band, and over a broad range of incidence angles in order to avoid stray light and ghost images. For the following illustrative examples, the objective is to use Stack 1 explicitly to maximize the bandwidth and dynamic range of the spectral range of conversion from PBV1 to PBV2 as much as possible. As the number of layers is increased to broaden the spectral coverage, so too is the composite $R_{th}$, which can modify (and in many instances increase) the compensation requirement. The latter is also specific to the polarization transformation, as will be shown in Examples 1 and 2.

As described previously, it is generally the case that one or more layers are inserted between Stack 1 and Stack 2. These layers are referred to generally as "optically-functional" layers, and they preferably accept light with PBV2, versus PBV1. Optically functional layers include all of the aforementioned examples, including compensation layers, passive/active components, polarization optics, refractive-elements, reflective-elements, diffractive-elements. The polarization transformation to PBV2 is intended to produce an optical response from the one or more optically functional layers that is closer to optimum than were PBV1 introduced. In some instances, PBV2 represents the optimum SOP, and thus it should be wavelength and AOI stable.

In Example 1 of the present disclosure, a positive uniaxial retarder Stack 1 is used to convert from linear to circular polarization over a broad range of wavelengths. Stack 2 either forms the reverse-order (RO) stack to convert to the orthogonal SOP, or Stack 1 is followed by a mirror, to force an effective RO arrangement in the reverse-pass. The design is required to operate over a broad range of visible wavelengths and to preserve that behavior off-normal via +C-plate compensation at a single location.

In related Example 2, a stack pair transforms from a linear basis vector (PBV1) to a circular polarization basis vector (PBV2) at the mid-point, restoring PBV1 after the second stack.

The design steps used in this example are as follows:

1. Constrain a reverse-order (RO) stack (containing an odd number of layers) to convert as broad a spectral band as possible to the orthogonal SOP. The constraint can use expansion of the off-diagonal terms of the impulse response in a Fourier sine-series. In this case, all layers have the same retardation which is half-wave at the design wavelength.

2. Divide the RO stack in half, forming Stack 1. Because the stack pair has an odd number of layers, the final layer is in general a quarter-wave retarder at the design wavelength. In order for the RO stack to convert to the orthogonal SOP, it must do so with retardation only (zero rotation). As such, the SOP at the mid-point is constrained to be circular.

3. Form Stack 2 as the reverse-order-reflection-about-zero (RORAZ) arrangement of Stack 1. That is, RORAZ is a reverse-order stack with the signs of the Stack 1 angles flipped in Stack 2. A characteristic of RORAZ is that it nullifies any retardation from Stack 1, while doubling rotation. Since the RO design is constrained to have minimal rotation, the RORAZ arrangement can restore the original SOP.

4. Insert compensation between the stack pair to suppress composite $R_{th}$, minimizing angle dependence of the normal incidence impulse response.

The specific solutions identified in Step 1 depend upon the digital-filtering tradeoff between side-lobe level and spectral coverage. Typically, the number and basic character of the set of solutions is consistent, with small angle adjustments resulting from the tradeoff. For this example, the side-lobe level of the power spectrum (associated with contrast-determining polarization purity) was maintained below 0.001, which largely determines the spectral coverage of each design. The one exception is the N=3 case, where a higher side-lobe was allowed in order to give sufficient visible spectral coverage. Note that the N=3 RO solution is very nearly that derived for an achromatic half-wave retarder by Pancharatnam in the 1950's without the benefit of signal-processing algorithms.

It is important to note that designs with a low number of layers typically cannot simultaneously have a high degree of polarization control, with broad spectral coverage. In this situation, light leakage that affects photopic contrast at normal incidence can result from side-lobes, insufficient spectral coverage (i.e. band edges), or a combination of the two. Retardation shift off-normal can increase side-lobe levels, shift a band-edge further into the visible, or both. Thus, while a design may perform adequately at normal incidence, it may be necessary to increase the number of layers in order to maintain performance with increasing AOI.

There are usually multiple designs with the same impulse response resulting from Step 1. RO solutions for N=3, 5, 7 and 9 layers were generated. For example, the (N=3) case produces two solutions, (N=5) has four solutions, (N=7) has eight solutions, and (N=9) has 12 solutions with the identical impulse-response. Table 1 entries represent a particular set of solutions where the HW layers have a "fan" angular arrangement.

A stack-pair with N layers and RO symmetry according to Step 1 produces Stack 1 designs with (N+1)/2 layers. Table 1 shows an example of preferred Stack 1 retardation/angles for RO designs with 3, 5, 7 and 9 layers. The table also shows the retardation/angle of the Stack 2 layers derived from Stack 1 according to Step 3.

Figure 3:
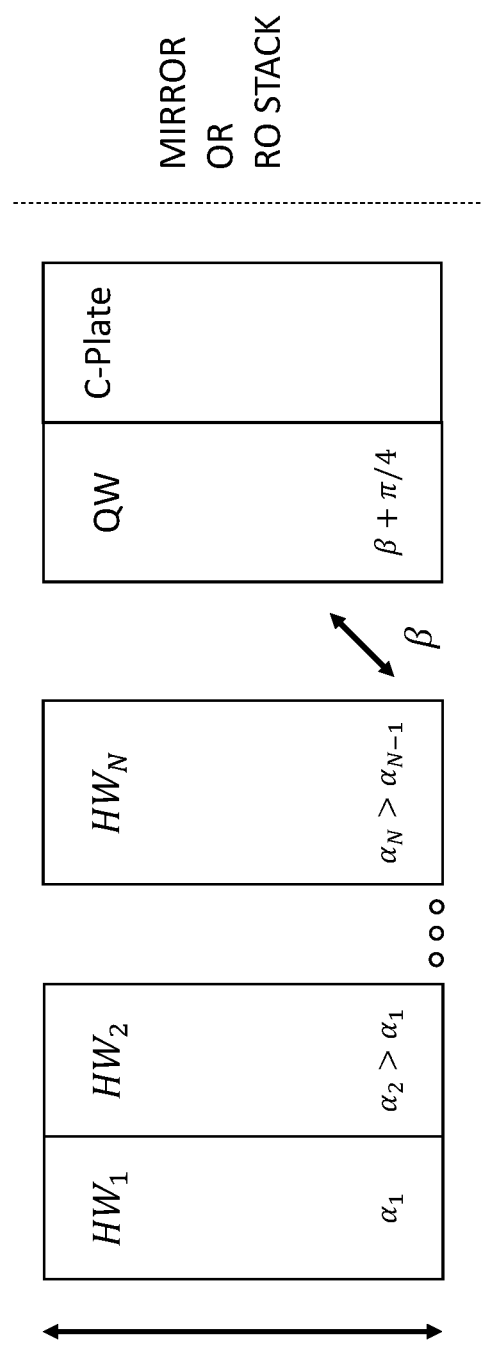
FIG. 3 shows a Reverse-Order (RO) retarder stack of the type disclosed herein, used to convert between linear and circular polarization over a wide range of incidence angles and wavelengths.

The present disclosure recognizes that not all of the stack designs with the identical (normal-incidence) impulse response have the same off-normal behavior. Moreover, not all of the stack designs can be compensated effectively using available (e.g. C-plate) compensators. One preferred family of solutions is illustrated in FIG. 3, including a particular arrangement of half-wave (HW) retarders followed by a single quarter-wave (QW) retarder. Specifically, the HW retarders have a successively increasing orientation (i.e. $\alpha_2 > 2\alpha_1$, $\alpha_3 > 2\alpha_2$, etc), as shown in Table 1, such that the magnitude of the polarization transformations observed on the Poincare sphere grows with each HW retarder. The net effect is a rotated linear state at the design wavelength, where the orientation of the polarization exiting the final HW retarder forms an angle of 45° with respect to the optic axis of the QW retarder. The purpose of the HW stack is to precondition the SOP, matching the ellipticity spectrum to that introduced in the final transformation by the QW retarder. Under ideal circumstances, this match allows the QW retarder to transform all relevant wavelengths to a pole of the Poincare sphere.

As discussed previously, increasing the number of half-wave layers can increase the precision of the impulse response, allowing an increase in spectral-coverage and dynamic range of the retarder stack. In this context, the objective of the half-wave stack is to produce a fixed polarization orientation (i.e. all wavelengths having the same longitude on the Poincare sphere) with ellipticity spectrum matched to that of the quarter-wave retarder (i.e. the spectral distribution of ellipticity in latitude above/below the equator). For a visible application, green light may lie on the equator, with blue below, and red above, such that the QW retarder maps all three bands to the pole. This transformation can become more precise as the number of layers increases, and with enough HW layers, can be a virtual identical match to that introduced by the QW retarder. Light exiting the QW can therefore in principle have unity ellipticity at all wavelengths.

The present disclosure anticipates the need for specific retarder-stack designs that transform a broad-range of wavelengths from a linear to a circular SOP (and vice-versa), which are also effectively compensated using available materials (e.g. +C-Plate retarders). +C-plate retarders were developed for the display industry using reactive-mesogens, or liquid-crystal-polymer coatings that can be applied directly to the retarder stack. The family of stack designs conforming to FIG. 3 can have these properties and are preferred over other designs with the same impulse response.

The following are examples of metrics that may be useful for assessing the performance of the retarder stack pairs of the present disclosure:

1. Normal incidence polarization ellipticity spectrum of PBV2. Again, this is limited by material (dispersion) properties, N, and somewhat by the choice of center wavelength. A method for evaluating this is modeling/measuring Stack 1 paired with the RO version of Stack 1 and evaluating the (e.g.) photopic contrast between parallel polarizers. The ability of the stack pair to convert to the orthogonal SOP is an indication of the ellipticity of PBV2.
2. Normal incidence restoration of PBV1. For the present, where ROC is not used, this can also be influenced by N and center wavelength. Performance can be given by the (e.g. photopic) contrast of the stack pair between crossed polarizers. Recall that ROC gives infinite contrast here for all PBV2, but solutions discussed herein may require that PBV1 is a stable eigenpolarization of the combined stacks. The associated transformation may be imperfect, limiting contrast.
3. AOI dependence of polarization ellipticity spectrum of PBV2 for compensated Stack 1. As in metric 1, a potential way to model/measure this is by pairing Stack 1 with the RO version of Stack 1 and evaluating the contrast polar plot between parallel polarizers
4. AOI dependent of the restoration of PBV1. As in metric 2, a potential way to model/measure this is by pairing compensated Stack 1 and Stack 2 and evaluating the contrast polar plot between crossed polarizers.

In Example 1 of the present disclosure, the performance is characterized here using metric 3 above. The design selected is that using three HW layers, with angles shown in Table 1. In this case, the model represents a true double-pass of Stack 1, with C-plate compensation retardation selected to minimize off-normal leakage through the polarizer in the return pass. For reference, an ideal isolator produces a linear SOP along the polarizer absorption axis after a double-pass of Stack 1 for all relevant wavelengths and incidence angles. The inverse of this gives the contrast of the isolator.

Figure 4:
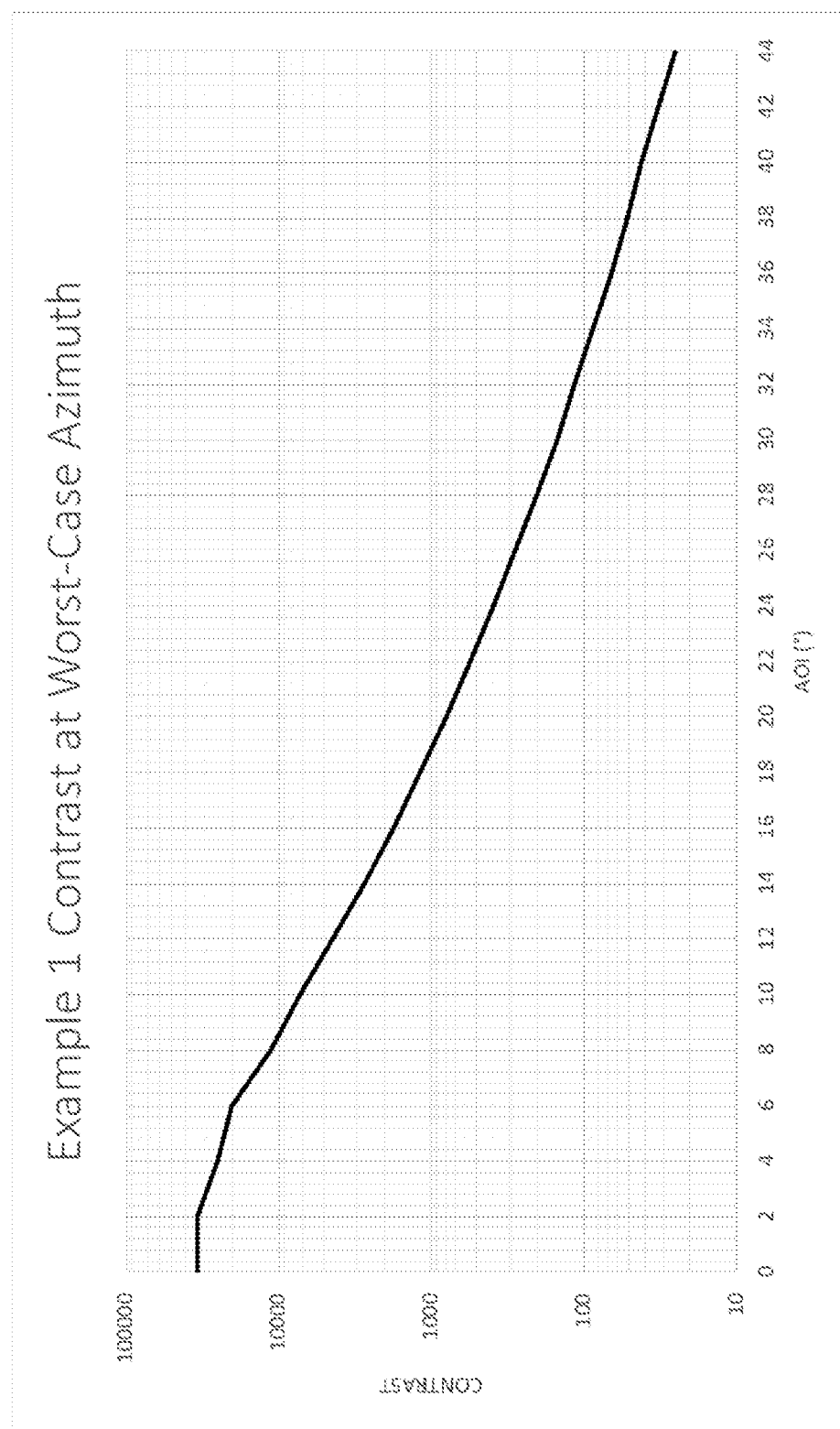
FIG. 4 shows the photopic contrast of an isolator of the present disclosure using the configuration of FIG. 3.

According to the present disclosure, the HW angles of FIG. 3 are selected to produce a rotation angle of approximately $\beta=2(\alpha_M-\alpha_{M-1}+\alpha_{M-2}-\alpha_{M-3}+\ldots)$, with the QW orientation given by approximately $\alpha_0=(\beta+\pi/4)$. For the three-HW example of Table 1, $\beta=65.2°$, giving a calculated QW angle of $-69.8°$. FIG. 4 is a line-plot through the contrast polar plot at the worst-case azimuth as a function of incidence angle. The contrast is calculated as the ratio of input lumens divided by the leakage lumens through the polarizer after a double-pass of the stack assuming a flat-top input spectrum. It shows >30,000:1 power conversion to the orthogonal SOP at normal incidence, with 1,000:1 at 19° AOI. The HW/QW retarders are dispersionless, with a center wavelength of 500 nm, and the dispersionless C-Plate has a positive $R_{th}$ of 80 nm (single-pass). The polarizer has zero transmission along the absorption axis and unity transmission in the orthogonal direction.

In Example 2 of the invention, the four design steps taught herein are used to convert from a linear PBV1 to a circular PBV2 via stack 1, followed by restoration of the input SOP via Stack 2. The performance is benchmarked against a design using the prior art ROC approach, where all of the four metrics are relevant. In this example, the simplest stack (N=3) in Table 1 is used, with the same material properties given for Example 1. Both the inventive and prior art design approaches can identify the same Stack 1, so it is assumed that metric 1 above is the same for both. Metric 3 can be optimized by selecting a C-plate retardation that maximizes the angular performance of the stack pair. Metric 2 is exemplary for the ROC arrangement, since it yields the identity matrix, though it is design-dependent for the techniques taught herein. The comparison focuses to a great extent on comparison of metric 4.

TABLE 1

Stack designs according to Example 2 steps.

| N | (N + 1)/2 | Retardation/Angle |
|---|---|---|
| 3 | 2 | (H) 14.9° (Q) 73.9°/(Q) −73.9° (H) −14.9° |
| 5 | 3 | (H) 4.5° (H) 28.9° (Q) −86.5°/(Q) 86.5° (H) −28.9°, (H) −4.5°, |
| 7 | 4 | (H) 1.5° (H) 11.2° (H) 42.3° (Q) −70.0°/(Q) 70.0° (H) −42.3° (H) −11.2° (H) −1.5° |
| 9 | 5 | (H) 1.2° (H) 8.8° (H) 32.3° (H) 80.9° (Q) −22.5°/ (Q) 22.5° (H) −80.9° (H) −32.3° (H) −8.8°(H) −1.2° |

Figure 5:
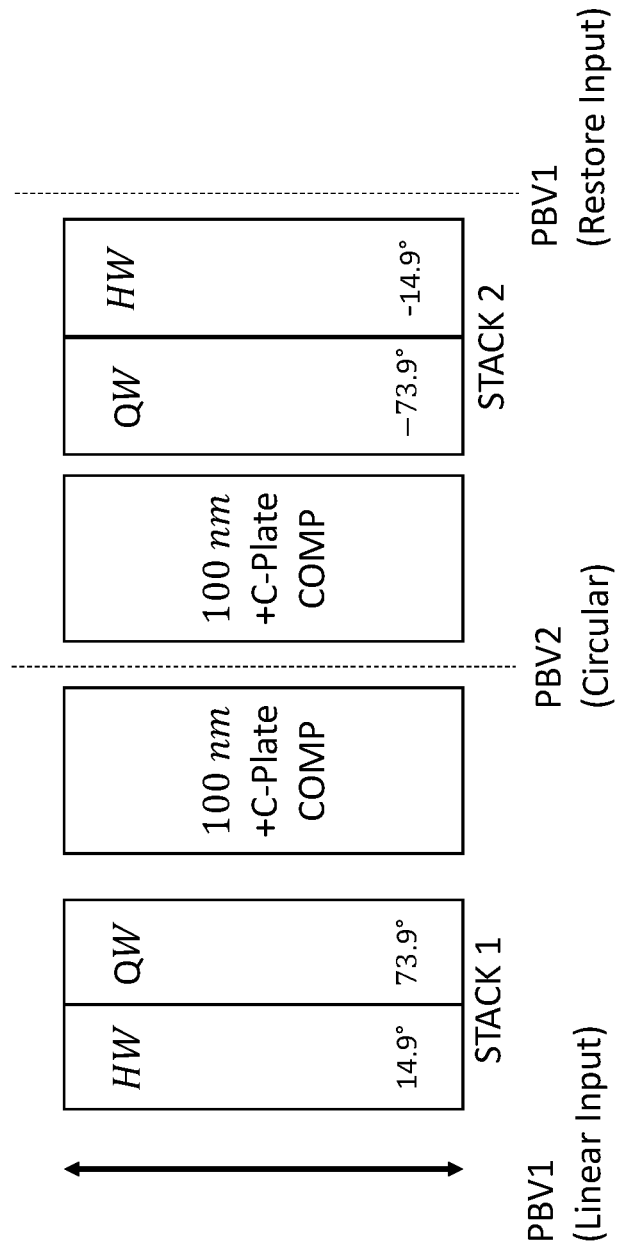
FIG. 5 shows a reverse-order-reflection-about-zero (RORAZ) stack pair of the present disclosure used to convert between linear and circular polarization over a wide range of incidence angles and wavelengths.

Depending on the optical configuration (e.g. a wide-angle-collimator), optimizing compensation for metric 3 and metric 4 can be done independently, according to Step 4. The objective is to identify Stack 1 compensation that optimizes off-normal stability of PBV2, that is also compatible with compensation of the combined stacks. For instance, a C-plate compensator with retardation $\Gamma_1$ may optimize PBV2, while a C-plate compensator with retardation $\Gamma_2$ optimizes the overall transformation. This can be accomplished using a pair of C-plates with retardation $\Gamma_1$ and retardation $(\Gamma_2-\Gamma_1)$. FIG. 5 is an example of this.

Figure 6:
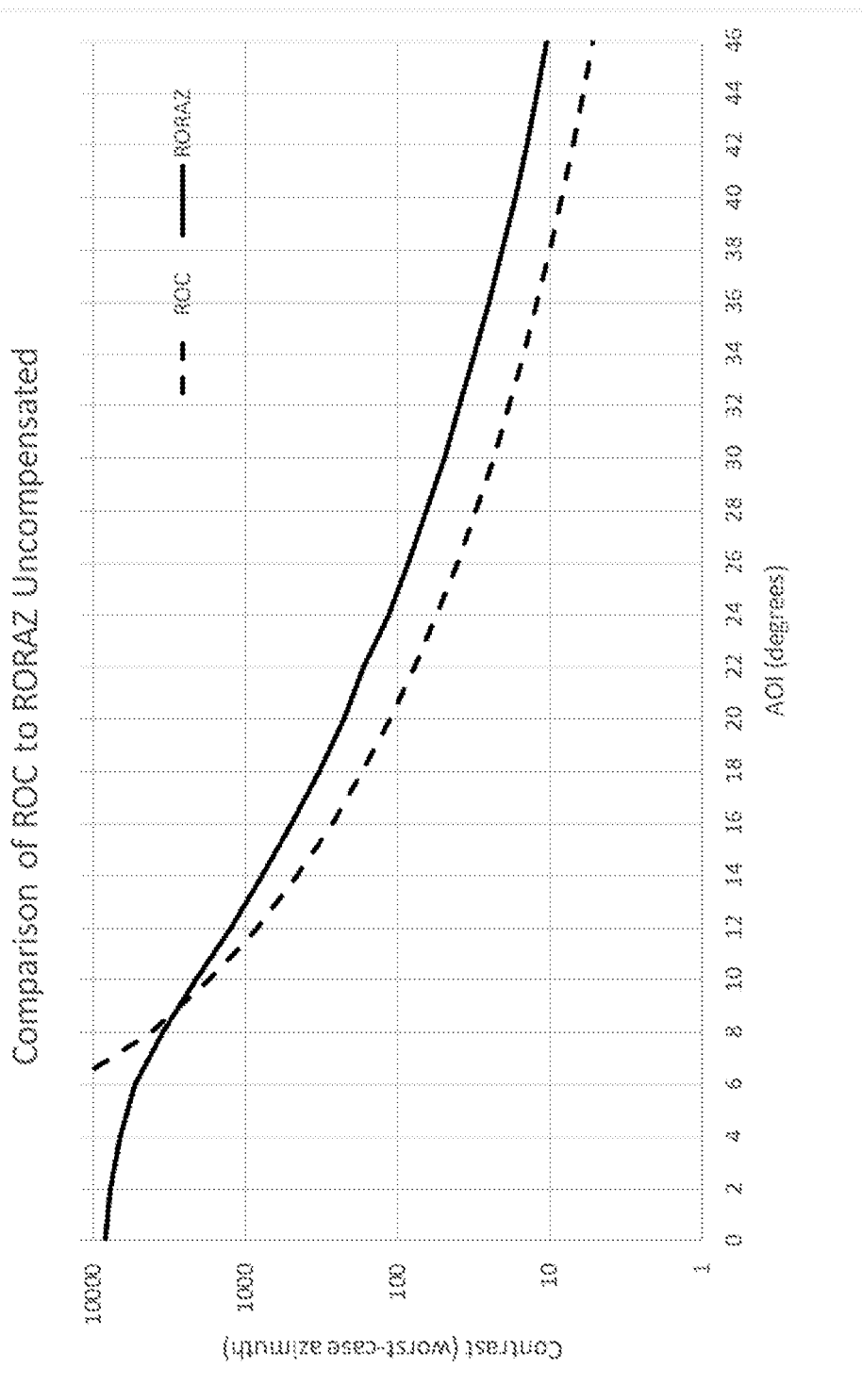
FIG. 6 shows photopic contrast versus incidence angle (at the worst-case azimuth angle) for the FIG. 5 configuration of the present disclosure, compared to the prior art reverse-order-cross configuration; both without compensation.

FIG. 5 shows the arrangement of an optimized design according to Example 2. FIG. 6 compares the contrast versus incidence angle (in air) at the worst-case-azimuth for the techniques taught herein and the ROC arrangement. The Figure verifies that the latter has relatively poor performance even prior to inserting any compensation between the stack pair. Note that the ROC solution converges to infinite contrast as the AOI goes to zero, so it out-performs this RORAZ example of the techniques taught herein for angles below 8°. However, the cross-over contrast is approximately 4,000:1; higher than typical systems measure even at normal incidence. Note that higher photopic contrast at normal-incidence could be obtained either by adding additional layers, or making a small adjustment to the N=3 design, which typically has the effect of enhancing performance in the green/yellow portion of the spectrum.

Figure 7:
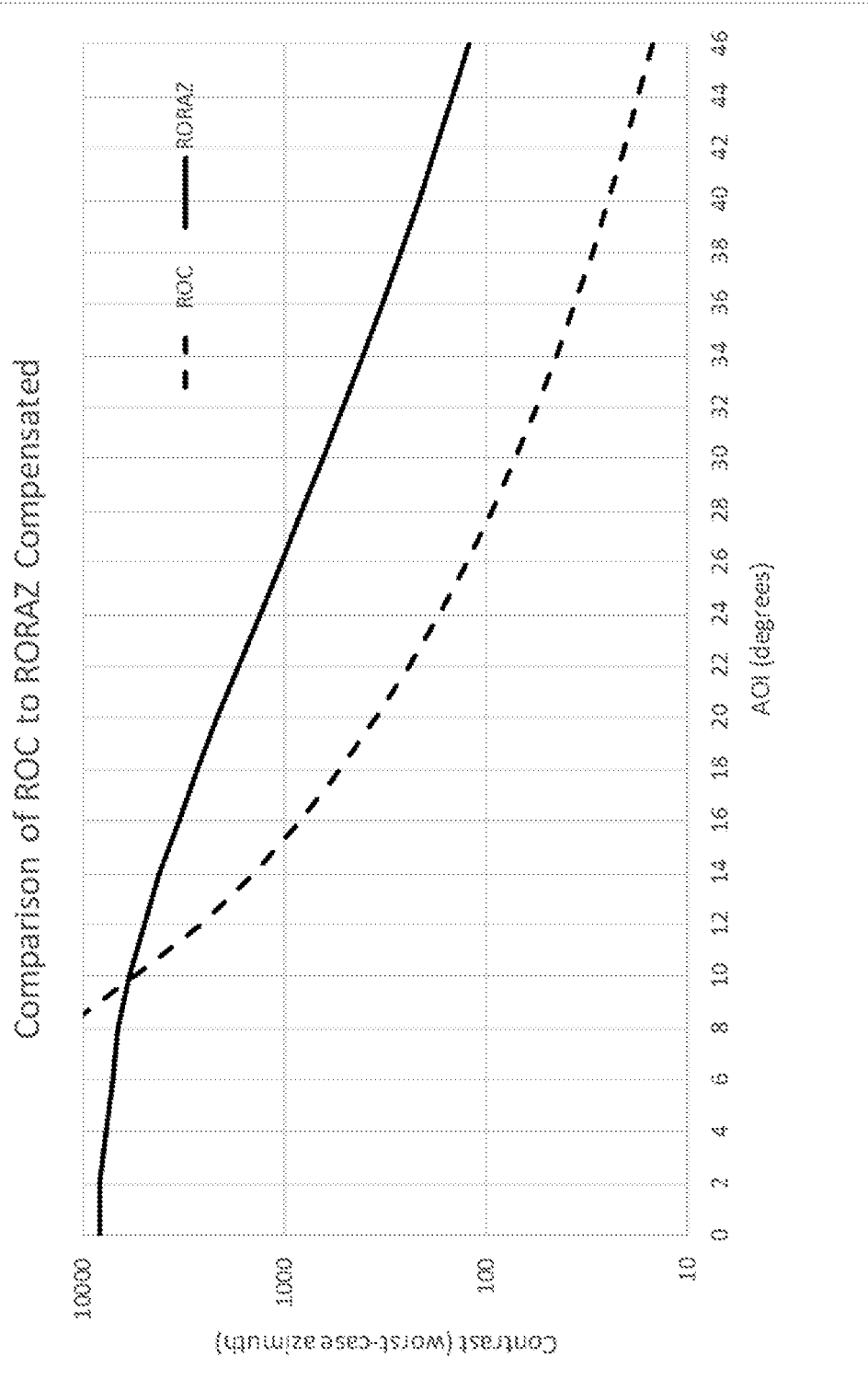
FIG. 7 shows contrast versus incidence angle (at the worst-case azimuth angle) for the FIG. 5 configuration, compared to the prior art reverse-order-cross configuration with 200 nm of +C-plate compensation.

A positive combined C-plate retardation of 200 nm was selected (i.e. $R_{th}=-200$ nm) based on maximizing the contrast polar plot of the stack pair (metric 4). It was determined that the optimum retardation for the +C-plate is higher for the ROC case (240 nm), which can create a slight difference between the PBV2 angular performance for the two cases. FIG. 7 compares the angle-dependent contrast of the compensated ROC arrangement and that of the techniques taught herein at the worst-case azimuth. As before, the ROC design has better performance at small angle, though the cross-over contrast now is approximately 6,000:1. For all larger angles, the techniques taught herein perform substantially better. Comparing FIG. 6 to FIG. 7 shows that, while the ROC case has incremental contrast improvement with compensation, the RORAZ case has a dramatic improvement. Again, this is because a large proportion of the retardation introduced by $R_{th}$ off-normal has a relatively uniform behavior in azimuth, and as such, can be compensated with a single +C-plate. For the Example 2 RORAZ design, FIG. 7 shows that the 1,000:1 contrast boundary is at approximately 26° AOI, 500:1 at 32°, 200:1 at 41°, and well over 100:1 at 46°. For any AOI above 24°, the techniques taught herein deliver 8-9× higher contrast than the compensated ROC case.

Compensation for stack $R_{th}$ can take many forms. When using positive uniaxial materials, $R_{th}$ is positive, usually requiring a compensator with a negative $R_{th}$. Examples of this include positive C-plates (positive uniaxial material with optic axis normal to the substrate), or crossed negative A-plates (negative uniaxial materials with optic axis in-plane) with matched retardation. Typical solutions include biaxially stretched uniaxial films, liquid crystal polymers and even inorganic crystals. The main difference between the behavior of these is the azimuth dependence of the applied compensation. Neither compensator affects the SOP at normal incidence. In the case where the SOP between the stacks is substantially circular, both compensators apply a retardation shift to any light incident off-normal. The magnitude of the compensation increases with AOI. The difference is that the projected optic axis orientation for the C-plate is in general contained in the plane of incidence (POI), while the optic axis of the crossed negative A-plate (CNAP) configuration is substantially fixed in orientation. In the POI containing the CNAP optic axes, the two compensators perform substantially the same (assuming all have the same base retardation). However, when the POI is at ±45° to this, the difference in azimuth angle between the two compensator optic axis orientations is at a maximum. Additionally, in this azimuth the optic axes of the CNAP retarders no longer appear crossed due to geometrical rotation.

Figure 8:
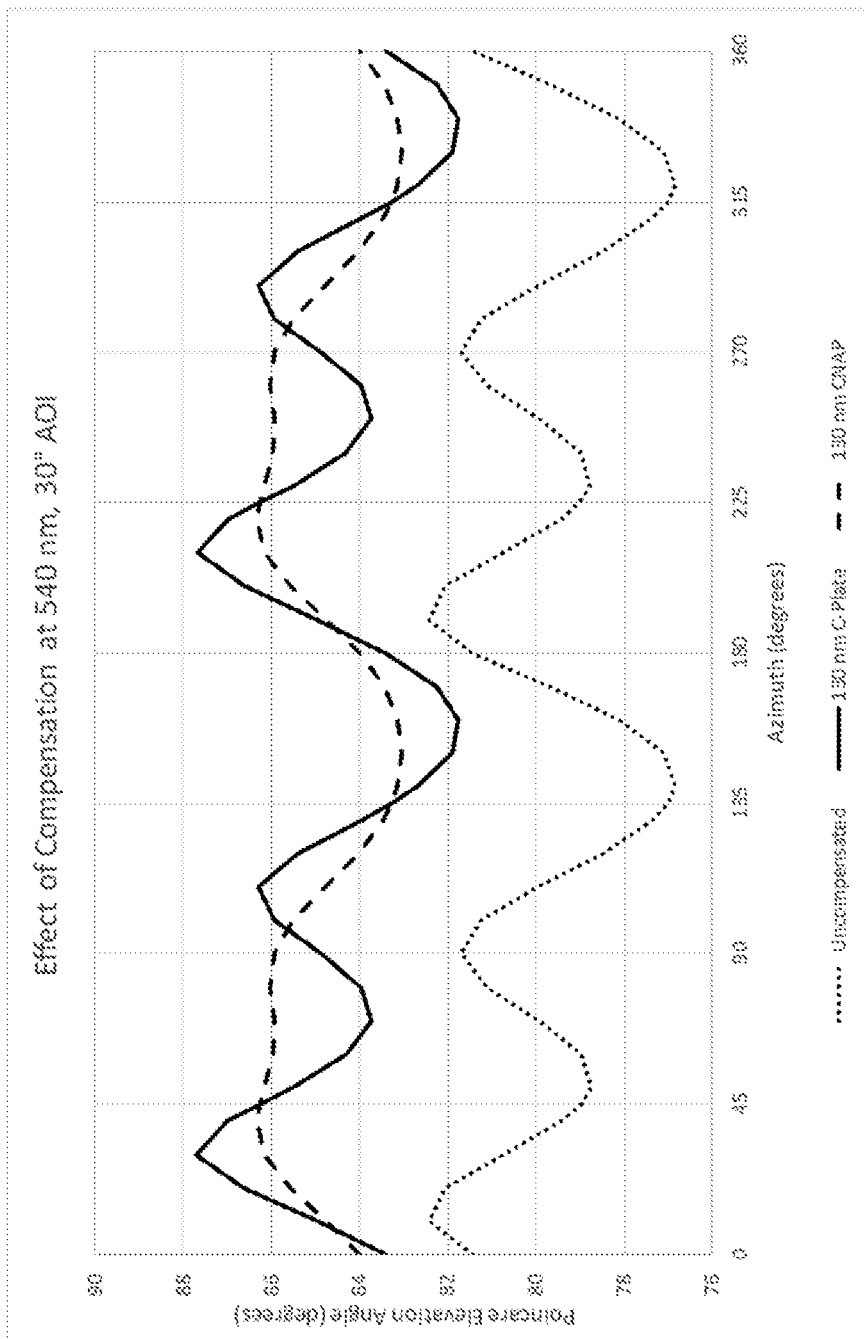
FIG. 8 shows green (540 nm) contrast versus azimuth angle at 30° incidence angle, for three configurations: (a) no compensation, (b) 130 nm of +C-plate compensation, and (c) a pair of CNAP retarders, each with 130 nm of retardation.

The amount of compensation needed (and the wavelength dependence of it) depends upon the specific stack design. Combinations of C-plate and CNAP compensators can be used in various configurations to best achieve this. The RORAZ design of Example 2 demonstrates the difference between two simple cases where positive C-Plate and CNAPs compensators are used with this stack design. The metric used here is the elevation angle (EA) for the SOP exiting Stack 1 with respect to the equator of the Poincare sphere, which is a measure of the ellipticity of PBV2. The ideal elevation angle is of course 90°, or unity ellipticity. FIG. 8 shows the azimuth-dependence of the Poincare EA in the green (540 nm) at 30° AOI for uncompensated Stack 1, compensation with 130 nm+C-Plate, and compensation with a pair of 130 nm CNAP retarders. The effectiveness of the compensation of course differs at other wavelengths. Note that the Poincare EA is the same for these compensation schemes when the POI contains an optic axis of the CNAP. In this case the CNAP optic axes are at ±45°. Also note that the peak-to-valley modulation in EA with azimuth is greater when using the C-plate than when using CNAP in this particular case, though both benefit substantially from the $-R_{th}$ compensation introduced by each type.

The ellipticity could also be expressed as a field-ratio in the frame of the elliptical polarization, where the field-ratio (FR) is unity for a circular SOP. For an elliptical SOP with $|E_y|<|E_x|$, the field-ratio ($\leq 1$) is related to the ellipticity via the angle $\varepsilon = \tan^{-1}FR$, or $\varepsilon = \tan^{-1}|E_y|/|E_x|$. For example, a high-performance retarder-stack such as is disclosed herein can produce an aggregated FR of >0.95 with N=3, and >0.98 with N=7 over the entire visible spectrum when using dispersionless zero-order retarders. The aggregated ellipticity field-ratio could also be expressed as photopically-weighted in the event that the eye is used as the sensor. The purpose of a compensator is to minimize the composite $R_{th}$ in order to maintain the aggregated FR near unity over as broad a range of incidence angles as possible.

Example 3

Another example is the case in which an achromatic rotation of coordinates is required. In this example, a stack pair generates an achromatic 45° rotated linear polarization basis vector (PBV2) at the mid-point, while restoring PBV1 after the second stack. The design steps used in this example are as follows:

1. Constrain a RORAZ stack (containing an even number of layers) to convert as broad a spectral band as possible to the orthogonal SOP. The constraint can use expansion of the off-diagonal terms of the impulse response in a Fourier cosine-series. In this case, all layers have the same retardation which is half-wave at the design wavelength.
2. Divide the RORAZ stack in half, forming Stack 1. Because the stack pair has an even number of layers, all layers of Stack 1 are half-wave at the design wavelength. In order for the RORAZ stack to convert to the orthogonal SOP, it must do so with rotation only (zero retardation). As such, the SOP at the mid-point is constrained to be 45° linear.
3. Form Stack 2 as the reverse-order (RO) arrangement of Stack 1. A characteristic of RO is that it nullifies any rotation from Stack 1, while doubling retardation. Since the RO design is constrained to have minimal rotation, the arrangement can restore the original SOP.

A stack pair with RORAZ symmetry according to Step 1 with N layers produces Stack 1 designs with N/2 layers. Table 2 shows the Stack 1 angles for RO designs with 4, 6, 8 and 10 layers, where all layers are half-wave retarders at the design wavelength and side-lobe levels are maintained below 0.001. Note again that there are multiple designs with the same impulse response. For example, the (N=4) case has four solutions, (N=6) has eight solutions, (N=8) has 16 solutions, and (N=10) has 32 solutions. Table 2 examples represent a particular set of solutions where the HW layers have a "fan" characteristic, as in Example 2. The table also shows the Stack 2 angles derived from Stack 1.

TABLE 2

Stack pair according to Example 2 design steps. All layers are half-wave at the design wavelength.

| N | N/2 | Angle |
|---|---|---|
| 4 | 2 | 10.5° 32.9°/32.9° 10.5° |
| 6 | 3 | 4.3° 19.6° 37.8°/37.8° 19.6° 4.3° |
| 8 | 4 | 1.7° 10.0° 26.1° 40.2°/40.2° 26.1° 10.0° 1.7° |
| 10 | 5 | 1.2° 7.1° 19.9° 34.4° 43.0°/43.0° 34.4° 19.9° 7.1° 1.2° |

In Example 3, a stack pair with N=6 is used, as shown in FIG. 6. The layers are all half-wave retarders at 530 nm, with zero birefringence dispersion.

One of the characteristics of Example 3 (rotator) designs is that compensation for retardation may have little impact. While the composite $R_{th}$ using uniaxial material is in general non-zero, a significant portion of it can be in the form of a linear compound retardation with optic axis stable and aligned with the input. As such, metric 4 is used in this case to compare native contrast performance of Example 3 to the ROC counterpart.

Figure 9:
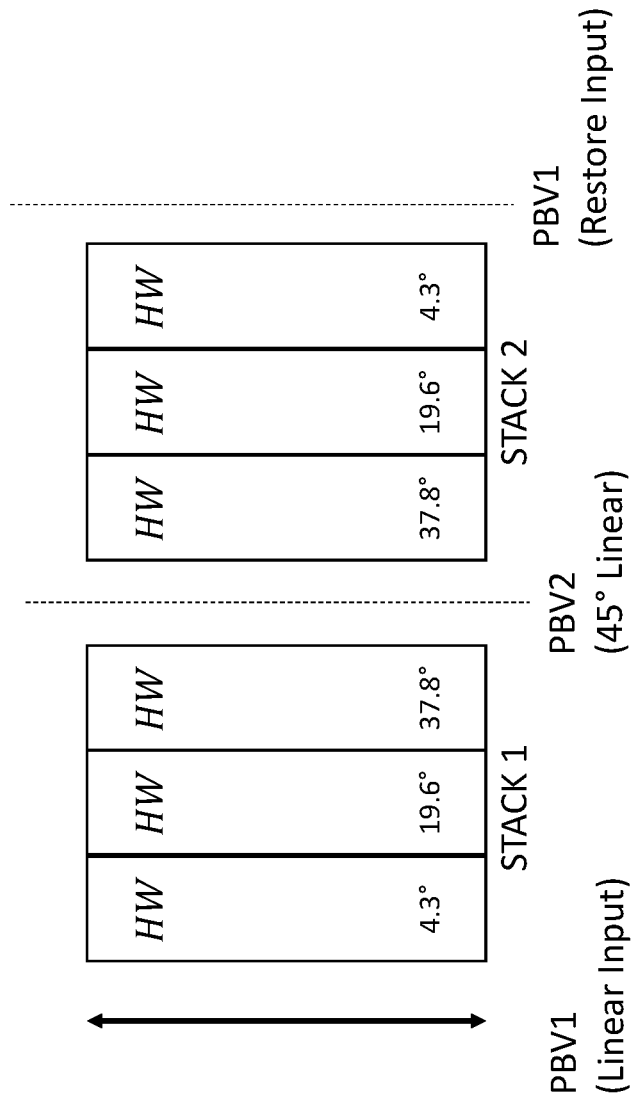
FIG. 9 shows a retarder stack pair of the present disclosure for converting between linear and 45° rotated linear polarization.
Figure 10:
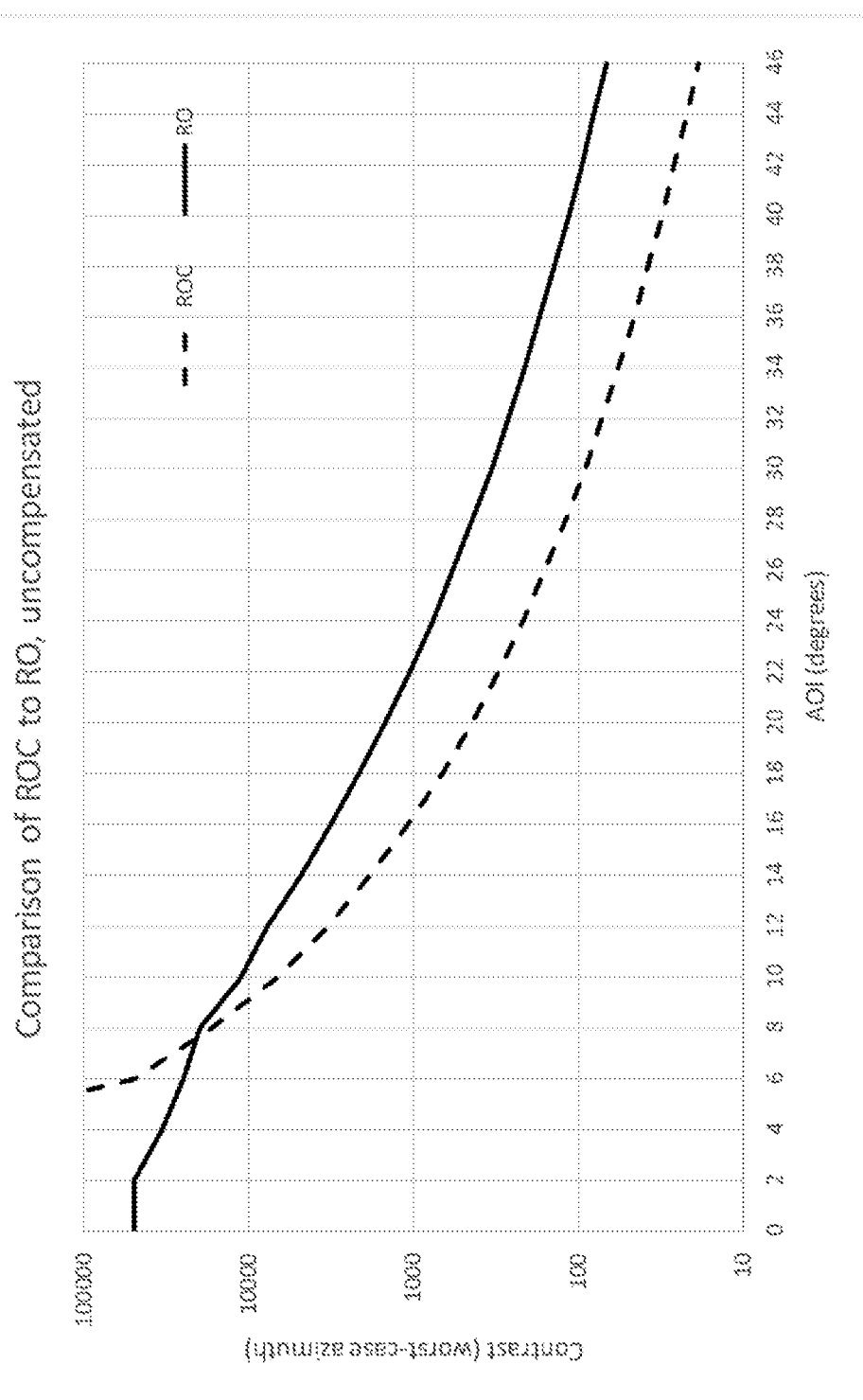
FIG. 10 shows photopic contrast for the FIG. 9 configuration, versus a prior art reverse-order-cross configuration

FIG. 9 shows the (metric 4) contrast versus incidence angle at the worst-case azimuth for the Example 3 design and for the ROC counterpart. The ROC design delivers higher contrast below 8°, but the contrast of Example 3 remains above 10,000:1 for angles smaller than this. For angles greater than 16°, the Example 3 design provides contrast between 3-4× greater than that of the ROC design.

In an aspect of the present invention, Stack 1 can be designed to produce a particular PBV transformation. A design angle symmetry is then exploited between Stack 1 and Stack 2 to restore the input PBV (e.g. Examples 2 and 3). It could alternatively be used to transform to a third PBV, as in Example 1. The set of solutions can in general be compensated at the mid-point to mitigate degradation of the normal-incidence impulse-response. This applies to arbitrary PBV cases, with the three examples given to illustrate the design methodology. It also includes (e.g.) PBV transformations from linear to orthogonal linear, circular to linear, circular to circular (of opposite handedness), etc. The examples given are illustrative, but are not intended to limit the scope of the invention.

Wide-angle wavelength selective polarization transformations are useful in, for example, image projection and direct-view display, image capture, sensors, polarization metrology, augmented/virtual/mixed-reality headsets, sunglasses, spectrometry, and telecommunications. The techniques taught herein can be applied to any situation where preservation of the normal-incidence impulse response of a retarder-stack must be maintained when light is incident off-normal. These techniques are particularly useful in situations where the building blocks are uniaxial retarders, or any retarder with non-zero $R_{th}$. The designs taught herein can be applied to any spectral band, including UV, near-infrared, and infrared bands.

Applicable materials include any organic or inorganic layer that functions as a linear retarder. Stretched organic retarder materials include polycarbonate (PC), polycarbonate co-polymers, polystyrene, and cyclic-olefin polymer (COP) or cyclic-olefin co-polymer (COC). Further included are liquid crystal polymers/reactive mesogens. Inorganic materials include crystals such as quartz, lithium niobate, and sapphire.

Embodiments of the invention that are designed to be broad-band (e.g. achromatic) benefit from base retarder materials with low birefringence dispersion. For example, COP has lower birefringence dispersion than PC so a particular achromatic stack design has broader spectral coverage with the former. Stated differently, there is a potential to achieve the same performance using COP, versus PC, using fewer layers. But the present disclosure recognizes the value of going beyond this; forming achromatic retarder stacks using a base-film that has reverse-dispersion (i.e. birefringence increases with wavelength). In this case, a base film that is already quasi-achromatic, can produce a retarder stack with extreme wavelength insensitivity using a simple stack design with just a few layers. For example, Teijin manufactures a co-polymer that has such reverse dispersion (WR-M) that can be used as the base-film of an achromatic retarder stack. For example, the three-HW layer stack of Table 1 can be used to create an isolator with broader spectral coverage than the zero-dispersion case shown in Example 1. Alternatively, a sufficiently achromatic base film can produce the normal-incidence performance of the three-HW layer stack using two HW layers, or potentially even one HW layer.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A device for manipulating a polarization of light, comprising:
a first retarder-stack (Stack 1) that converts a polarization of input light from a first polarization basis vector (PBV1) to a second polarization basis vector (PBV2), Stack 1 having a number of layers, retardation values, and orientations, wherein the number of layers, retardation values, and orientations of layers in Stack 1 are selected to produce a PBV2 that is substantially spectrally-uniform over a prescribed range of wavelengths;
a second retarder-stack (Stack 2) that returns the polarization of light from PBV2 to PBV1, wherein PBV 1 is a non-trivial eigen-polarization of combined Stack 1 and Stack 2, Stack 2 having a plurality of layers, wherein Stack 2 is arranged in series with Stack 1; and
one or more optically functional layers between Stack 1 and Stack 2;
wherein each of Stack 1 and Stack 2 have base retarder layers and the base retarder layers of Stack 1 and Stack 2 each have a thickness direction retardation ($R_{th}$) that is greater than or equal to half of the in-plane path-length difference ($R_e$) ($R_{th} \geq R_e/2$).

2. The device of claim 1, wherein the layers of Stack 2 have a reverse-order (RO) arrangement with respect to the layers of Stack 1.

3. The device of claim 1, wherein each of Stack 1 and Stack 2 have base retarder layers and the base retarder layers of Stack 1 and Stack 2 each have a birefringence dispersion of near zero.

4. The device of claim 1, wherein each of Stack 1 and Stack 2 have base retarder layers and the base retarder layers of Stack 1 and Stack 2 have reverse birefringence dispersion.

5. The device of claim 1, wherein each of Stack 1 and Stack 2 have base retarder layers and the base retarder layers of Stack 1 and Stack 2 are one of cyclic-olefin polymer, cyclic olefin co-polymer, or polycarbonate.

6. The device of claim 1, wherein the layers of Stack 1 and Stack 2 are solvent bonded to each other.

7. The device of claim 1, wherein PBV 1 is a linear polarization and PBV 2 is the ±45°-rotated version of PBV 1.

8. The device of claim 7, wherein Stack 1 contains two or more half-wave retarders.

9. The device of claim 7, wherein one or both of a positive c-plate and a crossed negative a-plate are inserted between Stack 1 and Stack 2 to reduce a composite $R_{th}$ of the device.

10. The device of claim 1, wherein PBV 1 is a linear polarization and PBV2 is a circular polarization.

11. The device of claim 10, further including a first linear polarizer preceding Stack 1 and a second linear polarizer following Stack 2, with the first and second linear polarizers having parallel or crossed absorption/reflection axes.

12. The device of claim 11, wherein the first linear polarizer layer is clad with protective substrates having $R_{th}<5$ nm.

13. The device of claim 10, wherein PBV2 has an ellipticity field-ratio that is at least 0.95 in red, green, and blue portions of a visible light spectrum.

14. The device of claim 10, wherein PBV2 has an ellipticity field-ratio that is at least 0.98 in red, green, and blue portions of a visible light spectrum.

15. The device of claim 10, wherein the layers of Stack 2 have a reverse-order-reflection-about-zero (RORAZ) arrangement with respect to the layers of Stack 1.

16. The device of claim 10, wherein Stack 1 contains one or more half-wave retarders followed by a quarter-wave retarder.

17. The device of claim 16, wherein Stack 1 contains M half-wave retarders with slow-axes oriented at angles ($\alpha_1, \alpha_2 \ldots \alpha_M$) such that ($\alpha_2>2\alpha_1, \alpha_3>2\alpha_2 \ldots$), producing a quasi-linear rotated SOP with orientation $\beta=2(\alpha_M-\alpha_{M-1}+\alpha_{M-2}-\ldots)$, followed by a quarter-wave retarder with slow-axis orientation substantially along $\alpha_0=(\beta+\pi/4)$.

18. The device of claim 15, further including one or both of a positive c-plate and a crossed negative a-plate inserted between Stack 1 and Stack 2 to reduce a composite $R_{th}$ of the device.

19. A device for manipulating a polarization of light, comprising:
a first retarder-stack (Stack 1) that converts a polarization of input light from a first polarization basis vector (PBV1) to a second polarization basis vector (PBV2), Stack 1 having a number of layers, retardation values, and orientations, wherein the number of layers, retardation values, and orientations of layers in Stack 1 are selected to produce a PBV2 that is substantially spectrally-uniform over a prescribed range of wavelengths;
a second retarder-stack (Stack 2) that returns the polarization of light from PBV2 to PBV1, wherein PBV1 is a non-trivial eigen-polarization of combined Stack 1 and Stack 2, Stack 2 having a plurality of layers, wherein Stack 2 is arranged in series with Stack 1; and
one or more optically functional layers between Stack 1 and Stack 2;
wherein PBV1 is a linear polarization and PBV2 is the ±45°-rotated version of PBV1.

20. The device of claim 19, wherein Stack 1 contains two or more half-wave retarders.

21. The device of claim 19, wherein one or both of a positive c-plate and a crossed negative a-plate are inserted between Stack 1 and Stack 2 to reduce a composite $R_{th}$ of the device.

22. The device of claim 19, wherein the layers of Stack 2 have a reverse-order (RO) arrangement with respect to the layers of Stack 1.

23. A device for manipulating a polarization of light, comprising:
   a first retarder-stack (Stack 1) that converts a polarization of input light from a first polarization basis vector (PBV1) to a second polarization basis vector (PBV2), Stack 1 having a plurality of layers having a number of layers, retardation values, and orientations, wherein the number of layers, retardation values, and orientations of layers in Stack 1 are selected to produce a PBV 2 that is substantially spectrally-uniform over a prescribed range of wavelengths;
   a second retarder-stack (Stack 2) that returns the polarization of light from PBV2 to PBV1, wherein PBV1 is a non-trivial eigen-polarization of combined Stack 1 and Stack 2, Stack 2 having a plurality of layers, wherein Stack 2 is arranged in series with Stack 1; and
   one or more optically functional layers between Stack 1 and Stack 2;
   wherein PBV1 is a linear polarization and PBV 2 is a circular polarization.

24. The device of claim 23, further including a first linear polarizer preceding Stack 1 and a second linear polarizer following Stack 2, with the first and second linear polarizers having parallel or crossed absorption/reflection axes.

25. The device of claim 23, wherein PBV2 has an ellipticity field-ratio that is at least 0.95 in red, green, and blue portions of a visible light spectrum.

26. The device of claim 23, wherein the layers of Stack 2 have a reverse-order-reflection-about-zero (RORAZ) arrangement with respect to the layers of Stack 1.

27. The device of claim 23, wherein Stack 1 contains one or more half-wave retarders followed by a quarter-wave retarder.

28. The device of claim 23, wherein one or both of a positive c-plate and a crossed negative a-plate are inserted between Stack 1 and Stack 2 to reduce a composite $R_{th}$ of the device.

* * * * *